Nov. 14, 1967  C. A. WOLL  3,352,052
FISH LURE
Filed June 2, 1965
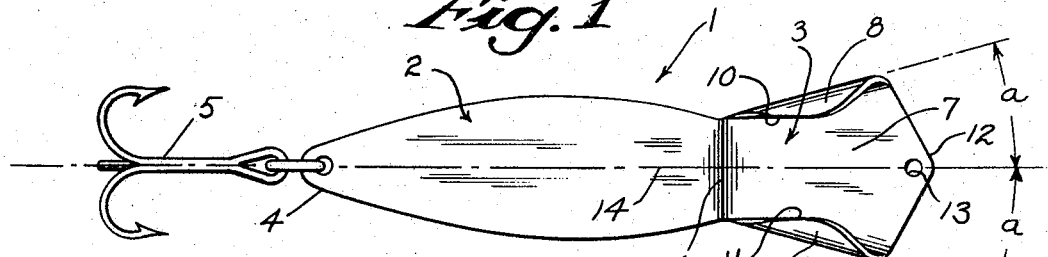
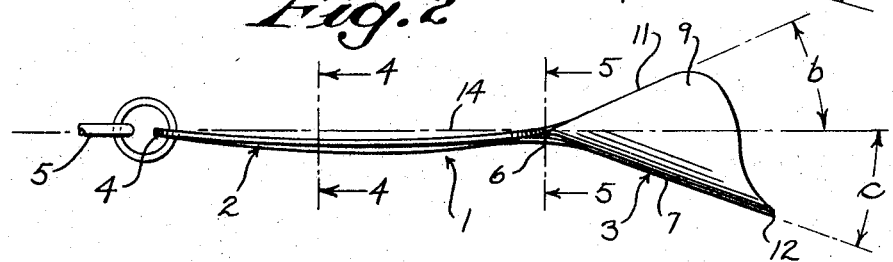
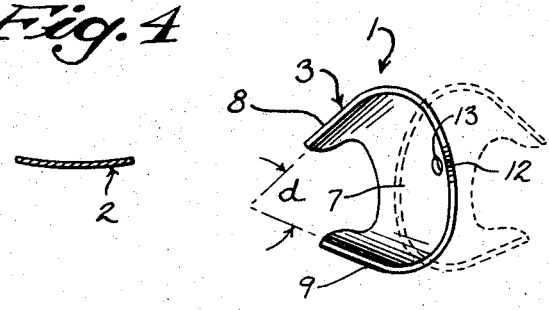
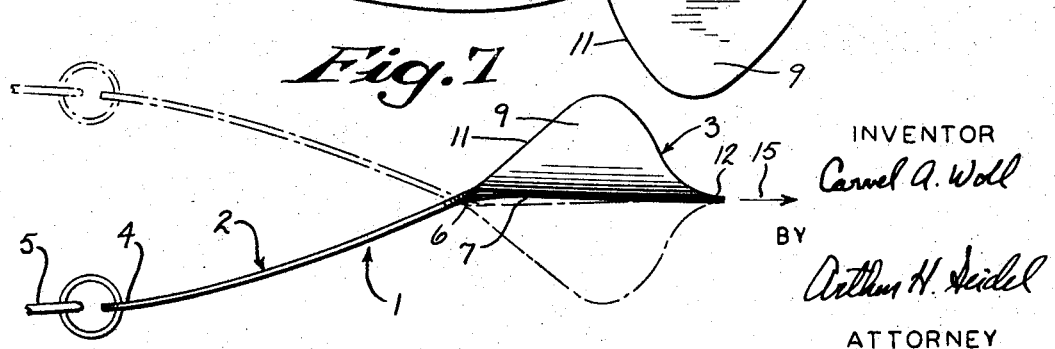
INVENTOR
Carvel A. Woll
BY
Arthur H. Seidel
ATTORNEY United States Patent Office 3,352,052
Patented Nov. 14, 1967

3,352,052
FISH LURE
Carvel A. Woll, 215 Division St.,
Chippewa Falls, Wis. 54729
Filed June 2, 1965, Ser. No. 460,645
7 Claims. (Cl. 43—42.06)

ABSTRACT OF THE DISCLOSURE

A fishing lure is disclosed having a body with a funnel shaped head section and an elongate blade section extending rearwardly from the body to terminate in a tail, the surface areas of the head section and blade section being substantially the same and the wide end of the funnel of the head section being at the nose of the lure, and wherein the funnel is open along one side to allow water entering the funnel to pass through the funnel and spill from the throat and the open side with exertion of pressure upon the funnel to oscillate the bait back and forth with a rolling like motion that extends through an arc of about 180°.

*Summary and background of the invention*

This invention relates to fishing lures of the spoon type, and it more specifically resides in a body formable from sheet material that comprises a blade section from which extends a head section that is funnel shaped and open along one side to spill water therefrom that enters the large opening of the funnel configuration at the head end of the lure.

A variety of configurations for spoon type fishing lures have been suggested in the past, and the literature has recognized the desirability of designing a lure that produces a body roll together with a side to side motion as it is retrieved through the water. The problem has remained to furnish a lure which will have these characteristic motions at both slow and fast speeds of retrieval. In many instances, a slowly retrieved lure will merely drag through the water without these movements, and in some instances at high speeds of retrieval lures will rotate so as to lose a zig-zag motion and to cause undesirable twisting of the line. Typical configurations, as heretofore taught, are found in Patents Nos. 1,963,380, 2,394,132, 2,476,388, 2,511,002, 2,603,901, 2,659,995, 2,791,057 and 2,922,245, and the present invention teaches an entirely different form of lure having enhanced utility in the fishing arts.

It is an object of the present invention to provide a spoon type of fishing lure in which desirable traits of movement are maintained at both high and low speeds of retrieval. Such movements include an oscillating body roll through an arc of approximately 180° in which the lure flips from one side to the other, together with a to and fro movement of the tail of the lure in a horizontal orientation. These movements simulate those of a small fish traveling through water, and most important the light reflections present a glittering effect that is believed to be of particular enticement to game fish.

It is a further object of the invention to provide a fishing lure which will reflect light in all directions, and to accomplish this purpose portions of the lure are disposed at such angles that light is reflected not only to the side but also fore and aft. The resulting light scattering effect should induce the notice of game fish through a greater area than for a lure which merely reflects light from side to side.

It is a further object of the invention to provide a fishing lure of a configuration having specifically defined head and blade sections in which the head section has a unique funnel configuration that gathers in water as the bait is retrieved to cause the resulting water pressure to impart desired action to the lure. The funnel shaped head is open along one side so that the water may be expelled, while imparting movement to the lure, and the head section is of such size that the desired movements of the lure will not be diminished during either slow or fast retrievals.

It is another object of the invention to provide a spoon type fishing lure that can be readily formed from flat metal stock, such lure having a three dimensional aspect when finished, so that it presents a substantial silhouette from any position of a view.

The foregoing and other objects and advantages of this invention will appear from the description to follow. In the description reference is made to the accompanying drawing which forms a part hereof, and in which there is shown by way of illustration a particular embodiment of the invention. The invention may be also be embodied in other forms than that specifically shown in the drawing, and reference is made to the claims appended to the end of this application for determination of the scope of the invention.

Referring now to the drawing:

FIG. 1 is a front view in elevation of a fishing lure embodying the invention,

FIG. 2 is a side view of the fishing lure of FIG. 1,

FIG. 3 is a head end view of the fishing lure shown in one position of body roll, and with another position of body roll depicted in phantom, FIG. 4 is a view in cross section of the fishing lure in the plane 4—4 shown in FIG. 2, FIG. 5 is a view in cross section of the fishing lure taken in the plane 5—5 shown in FIG. 2, FIG. 6 is a view of the body of the fishing lure developed in a flat plane, such as a stamping from which the lure may be shaped, and FIG. 7 is a side view of one position of the lure assumed during retrieval, together with an additional representation in phantom showing another position taken during retrieval.

Referring now to the drawing, the fishing lure has a body 1 formed from sheet metal stock such as a brass which can be highly polished, plated or decoratively finished with enamels to enhance the appearance of the lure. The body 1 is comprised of an elongate blade section 2 and a head section 3. The blade section 2 is slightly concave, as indicated in the cross section view of FIG. 4, and has a length approximating two and one-half to three times the width which terminates in a tail 4 apertured to receive a free swinging hook 5. The forward end of the blade section 2 tapers to a neck 6, at which point the blade section 2 merges into the forward head section 3, so that the blade section 2 is abaft the head.

The head section 3 can be described as funnel shaped with the large opening of the funnel at the forward end of the lure, so that the funnel configuration tapers back toward the neck 6 with a decreasing cross section area. The funnel configuration is also open along one side, as particularly shown in FIGS. 1 and 3, so as to form a throat or trough from which water entering the enlarged forward end of the funnel configuration can be discharged as it moves relatively through the funnel. The portion of the head section 3 opposite the open throat can be described as a back face 7, and as particularly shown in FIG. 3 it has a concave configuration, that is curved when viewed in cross section, which provides the rounded shape of the funnel. The back face 7 merges into, or is integrally continued as side vanes 8 and 9 which are on opposite sides of the funnel configuration and which have opposing edges 10 and 11, respectively, that define the open throat. The edges 10, 11 are spaced apart approximately the distance of the neck 6, and are also quite parallel to one another. The vanes 8 and 9, similarly as the back face 7, are also concave, to continue the funnel configuration through a substantially circular arc. The back face 7 extends forwardly of the vanes 8 and 9 to terminate in a nose 12 that presents an attachment eye 13 for securing the lure to a line.

A number of angles defining the configuration of the head section 3 are shown in the figures of the drawing. It is believed that these angles should be within certain ranges of value to have proper action of the lure as it moves through the water. The angles in FIGS. 1 and 2 are related to a fore and aft center line 14 which extends from the tip of the tail 4 forwardly to the surface of the neck 6, and then over the center of the nose 12 and attachment eye 13. Such center line 14 bisects the lure, when viewed from the front as in FIG. 1, since the upper and lower halves of the lure are mirror images of one another. Referring now to the angles shown in FIG. 1, each of the two angles $a$ are the vane angles at which the vanes depart from the center line 14, as the lure is viewed from the front. It has been found that a very satisfactory lure is achieved if the vane angles $a$ are each approximately 15°, and these angles should be kept within 10° of this value, so that the sum of the vane angles $a$, which is the angular opening of the funnel as viewed from the front, should be within 10° to 50°.

In FIG. 2 there is shown an angle $b$ which is the edge angle of the vanes at which the edges 10 and 11 depart from the center line 14 as viewed from the side of the lure. It has been found that a very satisfactory lure is achieved by setting this angle $b$ at approximately 25°, and the angle should preferably be maintained within 10° of this value. Angle $c$, also depicted in FIG. 2, is the slope angle of the face 7, at which the face 7 departs from the center line 14. This angle $c$ is preferably about 20° and its limits should be kept within 10° of this value. The funnel angle, which is exemplified by either of the two angles $a$, and also by the angle $c$ is within about 15° to 20° for the embodiment of the drawing, and should remain within about 5° to 30° for acceptable action of the lure in the water. A fourth angle $d$ is shown in FIG. 3, which is the angle of convergence of the vanes 8 and 9 toward one another when viewed from the head end of the lure. In practice, this angle has been 60°, and it is believed desirable to retain this angle between 55° to 65°.

Referring now to FIG. 6, in which the body 1 is developed in a plane to show the configuration before forming takes place, it is seen that the surface areas of the head section 3 and blade section 2 are approximately the same. The area of the head section 3 is slightly larger than the area of the blade section 2 in the particular embodiment shown, and it is desirable that the areas be retained within at least 20% of one another to secure good action of the lure in the water. Reference is now made to FIG. 7, in which there is shown in full lines one position of the lure and in phantom a second position of the lure. The two representations illustrate the nature of action of the lure as it is retrieved in a direction of the arrow 15. The lure will assume a position as shown in full lines, with the nose 12 pointing forward, or generally forward, and the tail 4 angulated to one side, although this angulation may not be substantial for some design parameters. As the lure moves forward water enters the large open end of the funnel shaped head section 3 and impinges upon the vanes 8, 9 and back face 7, so as to rock or roll the lure through an arc of approximately a half circle into the phantom position of FIG. 7. The water pressure causing the roll is believed to be a maximum upon the uppermost vanes 8, 9, but this assumption has not been verified. In any event, as the roll takes place the blade section 2 may angulate, so that the tail 4 shifts to the opposite side as shown in FIG. 7 to provide a wig-wag action. Thus, a motion is achieved that simulates a small fish moving through the water.

The extent of the roll of the lure is illustrated in FIG. 7, wherein the solid line representation shows the open throat of the head section 3 facing one side and the phantom line representation shows the open throat facing substantially the opposite direction. The roll shown is for an arc of 190°, and it has been found in the use of lures of the invention that an arc of about 180° can be substantially maintained over a wide range of retrieval velocities. As the rolling action takes place water pressure also works against the blade section 2 to modify movement of the lure, and hence the blade section 2 should have a substantial area as well as the head section. It has been further observed that the presence of a hook plays some role in deriving the action of the lure.

A particular feature of the invention is the funnel shaped configuration of the head section 3, in which the center line 14 can be said to substantially bisect the head section 3 in both front and side elevations, as shown in FIGS. 1 and 2. For example, if the angle $c$ is made very small, so that the back face 7 of the head section 3 lies in substantially the same plane as the blade section 2, the desired movements of the lure may be lost. Hence, it is a particular teaching of the invention to provide a funnel shaped head section for a spoon type lure which has an open throat to permit the discharge of water engulfed at the large open end of the funnel together with a positioning of the funnel configuration such that the center line of the lure is at a substantial angle with the surfaces of the funnel as viewed in both front and side orientations. A further advantage in the provision of a lure having the configuration of the invention is that light is reflected in all directions and fish may thus be attracted to the lure throughout a wide area of observation.

I claim:
1. In a fishing lure the combination comprising:
a body of sheet material having a funnel shaped head section from which extends abaft thereof an elongate slightly concave blade section terminating in a tail adapted for attachment of a hook, the surface areas of the head section and blade section being within twenty percent of one another, and said blade section defining a fore and aft center line running from the tail thereof to a neck at the juncture of the head and blade sections;
said head section having a face portion forming one side of said funnel configuration that extends forward from said neck to a line receiving nose at an angle diverging from said center line that is between ten to thirty degrees; and
said head section further having vane portions continuing around from opposite sides of the face portion to continue said funnel configuration, the vane portions diverging from one another in their forward extent at a vane angle of between ten to fifty degrees, and each vane terminating along an edge spaced from the edge of the opposite vane to present an open throat opposite said face portion, the edges of said vanes diverging from said center line in a forward direction at an angle between fifteen to thirty-five degrees and said vanes converging toward one another at an angle between fifty-five to sixty-five degrees.
2. In a fishing lure the combination comprising:
a body having a funnel shaped head section from which extends abaft thereof an elongate blade section terminating in a tail, the surface areas of the head section and blade section being substantially the same, and said blade section defining a fore and aft center line running from the tail thereof to a neck at the juncture of the head and blade sections;
said head section having a face portion forming one side of said funnel configuration that extends forward from said neck at an angle diverging from said center line that is substantially twenty degrees; and said head section further having vane portions continuing around from opposite sides of the face portion to continue said funnel configuration, the vane portions diverging from one another in their forward extent at a vane angle of substantially thirty degrees, and each vane terminating along an edge spaced from the edge of the opposite vane to present an open throat opposite said face portion.

3. In a fishing lure the combination comprising:

a funnel shaped head section with the large end of the funnel at the front of the lure and terminating in a neck at the rear of the funnel configuration;

said head section having a face portion that extends forwardly from said neck to a nose to form one side of the head section, said face portion also being concave in cross section to provide a curved surface for the funnel configuration;

said head section having vane portions continuing around from opposite sides of the face portion to present oppositely facing surfaces of said funnel configuration which diverge from one another in their forward extent at an angle between ten to fifty degrees;

said vane portions terminating in fore and aft edges spaced from one another to provide an open throat in the funnel shaped head section that is opposite said face portion, said edges and said face portion diverging from one another in a forward direction at an angle between twenty-five to sixty-five degrees; and said lure having a blade section attached to said head section at said neck and extending rearwardly therefrom with a length greater than its width.

4. In a fishing lure the combination comprising:

an elongate blade section formed of sheet material terminating in a tail and extending forward to a neck;

a head section formed of sheet material connecting with said blade section at said neck and extending to a forward nose, said head section being funnel shaped with increasing cross section area in a forward direction and the funnel configuration being open along one side to spill water therefrom that enters from the front; and said funnel shaped head being oriented with respect to said blade section such that a center line for the blade section forms a substantial angle with the surface areas of the funnel configuration as viewed in both front and side orientations, whereby water entering said funnel shaped head turns the head from side to side through approximately a 180° arc.

5. In a fishing lure the combination comprising:

an elongate blade section terminating in a tail and extending forward to a neck;

a head section connecting with said blade section at said neck and extending to a forward nose, said head section being funnel shaped with the large end of the funnel at the forward end of the lure, and the funnel configuration being open along one side to spill water therefrom that enters the head section; and said funnel shaped head being oriented with respect to said blade section such that the surface areas of the funnel configuration diverge from a center line for the blade section, whereby water entering said funnel shaped head rolls the head from side to side upon drawing the lure through the water.

6. A lure as in claim 5, wherein the surface areas of the head and blade sections are within twenty percent of one another.

7. A lure as in claim 5 wherein the angle of divergence, in a forward direction, between the surface of the funnel configuration and the center line is within five to thirty degrees.

References Cited

UNITED STATES PATENTS

| | | | |
|---|---|---|---|
| D. 162,776 | 4/1951 | Bekkala | 43—42.5 |
| D. 174,420 | 4/1955 | Ferguson | 43—42.5 X |
| 2,789,384 | 4/1957 | Dzialo et al. | 43—42.06 |

SAMUEL KOREN, *Primary Examiner.*

D. J. LEACH, *Assistant Examiner.*